Figure 1:
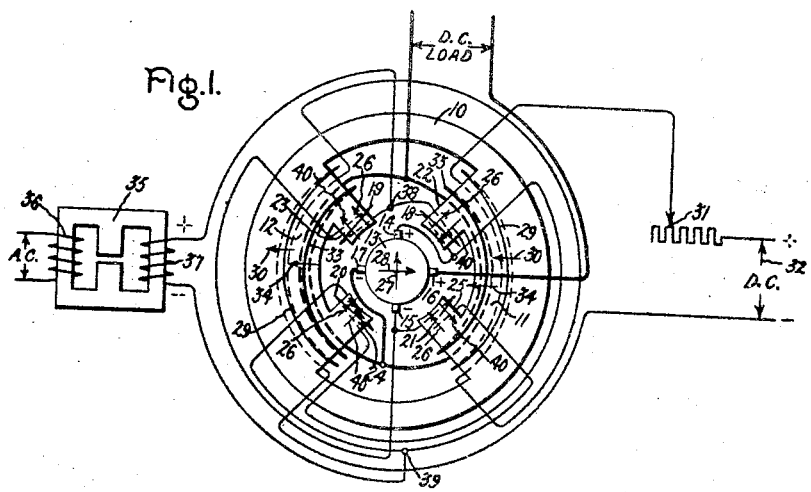

Jan. 12, 1943.  A. FISHER  2,307,774

DYNAMO-ELECTRIC MACHINE

Filed Dec. 31, 1941

Inventor:
Alec Fisher,
by Harry E. Dunham
His Attorney.

Patented Jan. 12, 1943

2,307,774

UNITED STATES PATENT OFFICE 2,307,774

DYNAMOELECTRIC MACHINE

Alec Fisher, Lynn, Mass., assignor to General Electric Company, a corporation of New York Application December 31, 1941, Serial No. 425,102

21 Claims. (Cl. 171—312)

My invention relates to direct-current commutator type dynamo-electric machines and more particularly to an arrangement for reducing the effects of residual magnetism and hysteresis in such machines. It supplies particularly to machines wherein the armature reaction of the machine provides a source of excitation thereto.

A direct current machine of the armature reaction excitation type is a dynamo-electric machine provided with a rotor or armature having a winding formed with coils connected to a commutator of the conventional direct current type. The stationary member of such a machine usually is arranged to provide a path of low magnetic reluctance to the magnetic flux set up by the armature currents, and generally is provided with various windings to improve or control the operation of the machine. The basic principle of operation of my machine is similar to that of the Rosenberg generator in that it depends upon the armature reaction flux produced by current flowing between two sets of brushes for providing the desired characteristics of the machine. By providing special field exciting windings on the stationary member, this type dynamo-electric machine may be made to provide a controllable variable voltage and variable current characteristic obtaining very high rate of response and high amplification ratio. In order to obtain these desirable features, the machine is provided with a control field winding or windings having very small inductance and another field exciting winding arranged to neutralize or compensate for the normal armature reaction produced by the load or secondary current of the machine. I have found that residual magnetism and hysteresis in such a machine often tend to impair the operation thereof.

An object of my invention is to provide a dynamo-electric machine having an improved construction for minimizing the effects of residual magnetism and hysteresis.

Another object of my invention is to provide an improved armature reaction excitation type dynamo-electric machine having a field exciting winding energized in a manner such as to minimize the effects of residual magnetism and hysteresis in the machine and substantially to neutralize mutual coupling of electric current in the secondary circuit of the armature with the control winding of the machine by substantially neutralizing the secondary armature reaction.

A further object of my invention is to provide an improved armature reaction excitation type dynamo-electric machine having a field exciting winding energized in a manner such as to minimize the effects of residual magnetism and hysteresis in the machine and also energized to provide a component of excitation to the machine which is cumulative with the primary excitation thereof and reduces the primary energizing or short-circuit current thereof.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 2:
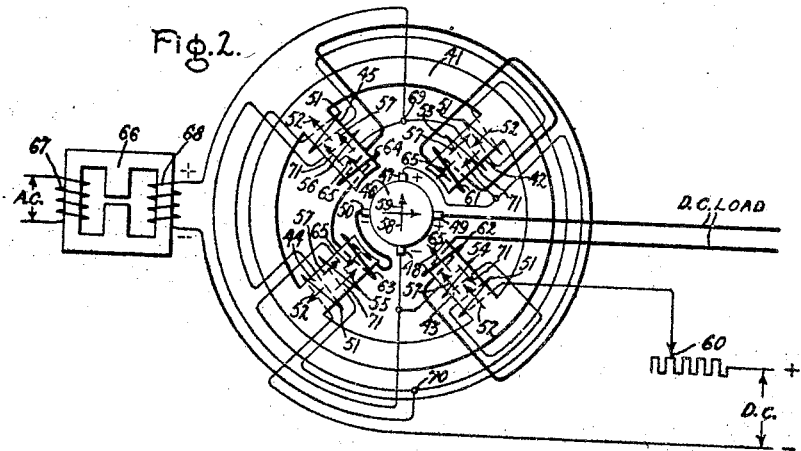
Figure 3:
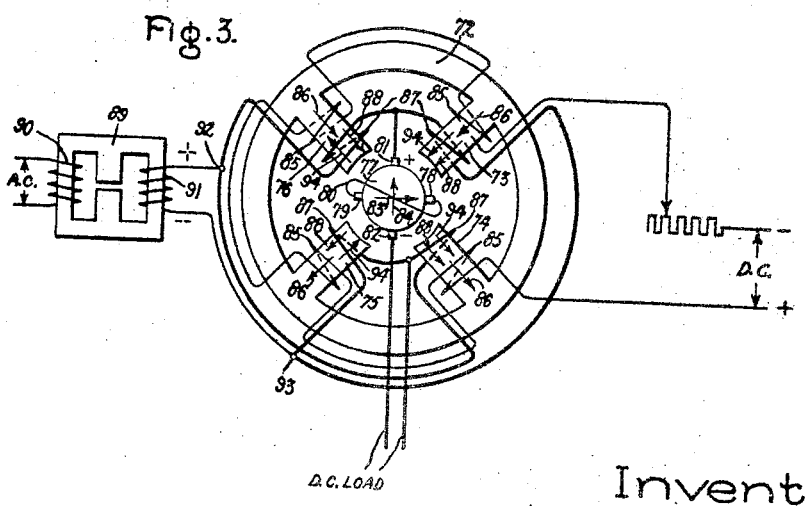

In the drawing Fig. 1 schematically illustrates an armature reaction dynamo-electric machine provided with an embodiment of my invention; Fig. 2 schematically illustrates another embodiment of my invention; and Fig. 3 schematically illustrates a further modification of my invention.

Referring to the drawing, I have shown in Fig. 1 an armature reaction excited dynamo-electric machine provided with a stationary member magnet frame 10 of magnetic material having a pair of main pole pieces 11 and 12 adapted to provide a path of low magnetic reluctance for the armature reaction fluxes of the machine. The characteristics of this type machine are based fundamentally on the voltages induced in the armature by armature reaction excitation produced by currents flowing in an armature winding of an armature 13. This armature or rotatable member 13 is of the conventional direct current type and is adapted to be driven at a substantially constant speed by any suitable source of mechanical power. In order to provide the desired excitation to the machine, the armature reactions are adapted to be controlled by various field exciting windings and by arranging a set of primary brushes 14 and 15 to provide a primary circuit through the armature 13. A set of secondary brushes 16 and 17 is arranged to contact the commutator of the armature 13 and is electrically displaced thereabout from the primary brushes 14 and 15 to provide a secondary circuit through the armature. With this arrangement, the primary brushes 14 and 15 are substantially short-circuited through a field exciting winding including winding sections 18, 19, 20, and 21 arranged on pole piece projections 22, 23, 24, and 25, respectively, of the main pole pieces, and these field exciting winding sections are arranged on the pole pieces to provide direct current or unidirectional components of excitation to the pole pieces, as indicated by the arrows 26. With this arrangement, a very small amount of flux is required to induce a voltage between the primary brushes 14 and 15 to build up a relatively large primary current through that part of the armature which is connected between these brushes. This primary current will produce a component of magnetic excitation or primary armature reaction along the primary commutating axis of the machine, as indicated by the arrow 27. This primary armature current will energize the quadrature field exciting windings 18, 19, 20, and 21, and the resultant excitation of these field exciting windings will be in the same direction and cumulative with the primary armature reaction and of the direct current or unidirectional type. Thus, for a predetermined primary excitation, the control field may be very small, as the primary current produces a magnetic excitation in the armature 13 which is cumulative with the primary excitation of the stationary member 10. As the armature rotates, the conductors which are connected between the secondary brushes 16 and 17 will cut the primary flux and a voltage will be induced between these brushes. When a load circuit is connected to these secondary brushes, a secondary or load current will flow through the secondary circuit of the armature and a secondary armature reaction will be produced along the commutating axis of these brushes, as indicated by the arrow 28.

In order to control the secondary or load characteristics of this machine, a field exciting winding 29 is arranged to provide a component of magnetic excitation along the secondary commutating axis of the machine, as indicated by the arrows 30. The resultant excitation provided by this winding acts in a direction opposite to the secondary armature reaction 22 and is adapted to induce an electromotive force in the armature winding between the primary brushes 14 and 15. Any suitable means, such as a variable resistor 31, may be provided to vary the energization of this winding to control the excitation thereof from a source of electrical power supply 32, and thereby control the voltage induced between the primary brushes. As explained in the Alexanderson and Edwards Patent 2,227,992, the sensitivity and the speed of response of the machine to variations in the energization of the control field exciting winding 29 is increased by providing a compensating field exciting winding 33 arranged to provide a component of excitation which is substantially equal and opposite to the secondary armature reaction. This winding 33 is adapted to provide a component of excitation in a direction as indicated by the arrows 34 responsive and proportional to the secondary armature current by connecting the winding 33 in series with the secondary brush 17. By such an arrangement, the excitation provided by the compensating field exciting winding 33 substantially neutralizes the magnetic back coupling of electric current in the secondary circuit of the armature with the primary circuit by substantially neutralizing the armature reaction flux along the secondary axis.

The accuracy of the control of this type of dynamo-electric machine can be increased by minimizing the effects of residual magnetism and hysteresis in the machine by providing a demagnetizing exciting arrangement or alternating current component of excitation to provide components of magnetic excitation which have substantially no effect on the main poles of the machine and which are substantially independent of other components of excitation of the machine. This may be produced by providing components of magnetic excitation of opposite or reversed polarity to adjacent pole piece projections 22, 23, 24, and 25, thereby minimizing the inductance effect of this excitation with the other field exciting windings of the machine. I have found that the effectiveness of the demagnetizing field excitation is greatly improved by energizing it with a variable electric current having a peaked wave form. This component of excitation is obtained in the illustrated arrangement by connecting an alternating current source of electrical power supply to the field exciting winding sections 18, 19, 20, and 21 intermediate the direct current armature connections of these coils. This energization is provided by a peaked wave form transformer 35 having its primary winding 36 connected to any suitable source of alternating current and its secondary winding 37 connected to terminals 38 and 39 of the field exciting windings 18, 19, 20, and 21, such that adjacent pole piece projections are excited with a component of magnetic excitation of opposite polarity, as indicated for instantaneous values by the arrows 40. This second component source of energization periodically reverses the component of excitation provided by the field exciting winding sections 18, 19, 20, and 21 in each polar projection in accordance with the frequency of the alternating current impressed across the primary winding 36 of the transformer providing an alternating and pulsating component of excitation and thereby minimizes the effects of residual magnetism and hysteresis on the excitation of the machine by an alternating current component of excitation substantially independent of other components of excitation of the machine. In machines having relatively large secondary pole pieces 11 and 12, as in this machine, the same beneficial results may be obtained by arranging the field exciting winding sections 18, 19, 20, and 21 as pole face windings in the faces of the pole pieces 11 and 12 to provide the above components of excitation thereto.

In Fig. 2, I have shown another embodiment of my improved armature reaction excited dynamo-electric machine provided with a stationary member magnet frame 41 of magnetic material having pole pieces 42, 43, 44 and 45 arranged to provide a path of low magnetic reluctance for the armature reaction flux and the field excitation of the machine. This machine is provided with an armature or rotatable member 46 of the conventional direct current type which is adapted to be driven at a substantially constant speed by any suitable source of mechanical power. As in the arrangement shown in Fig. 1, the armature reactions of the machine are utilized to provide the desired characteristics thereto. These armature reactions are obtained by arranging a set of primary brushes 47 and 48 to provide a primary circuit through the armature and a set of secondary brushes 49 and 50 arranged in circumferentially spaced apart relationship with respect to the primary brushes and in contact with the commutator of the armature 46 to provide a secondary or load circuit through the armature. In order to control the secondary or load characteristics of the machine, a field exciting winding 51 is arranged to provide components of magnetic excitation, as indicated by the arrows 52, which provides a resultant component of magnetic excitation along the secondary commutating axis of the machine. With such an arrangement, a very small amount of flux is required to induce a voltage between the primary brushes, and these primary brushes 47 and 48 are substantially short circuited through a short-circuiting field exciting winding including winding sections 53, 54, 55, and 56 arranged on pole pieces 42, 43, 44, and 45, respectively, to provide direct current or unidirectional components of magnetic excitation to these pole pieces, as indicated by the arrows 57. Thus, a relatively large primary current will flow through the primary circuit of the armature, producing a primary armature reaction as indicated by the arrow 58, substantially in the same direction as the resultant magnetic excitation produced by the short-circuiting field exciting windings 53, 54, 55, and 56. Thus, the total primary excitation of the machine comprises the summation of these two resultant excitations and for a predetermined primary excitation, the control field may be very small. As the armature rotates, the armature winding conductors which are connected between the secondary brushes 49 and 50 will cut the primary excitation flux, and a voltage will be induced between these brushes. When a load circuit is connected to these secondary brushes 49 and 50, a secondary or load current will flow through the secondary circuit of the armature and a secondary armature reaction will be produced along the secondary commutating axis, as indicated by the arrow 59. This secondary armature reaction is opposed to the resultant component of excitation provided by the control field exciting winding 51 and, therefore, tends to decrease the sensitivity and the speed of response of the machine to variations in the energization of the control field exciting winding 51 which may be provided by any suitable control device, such as a variable resistor 60. In order to improve the sensitivity of the machine, a compensating field exciting winding including winding sections 61, 62, 63, and 64 is arranged on the pole pieces 42, 43, 44, and 45, respectively. This compensating winding is adapted to provide a component of excitation in a direction, as indicated by the arrows 65, responsive and proportional to the secondary armature current by connecting this compensating winding in series with the secondary brush 50. With such an arrangement, the excitation provided by the compensating field exciting winding substantially neutralizes magnetic back coupling of electric current in the secondary circuit of the armature with the primary circuit by substantially neutralizing the armature reaction flux along the secondary commutating axis of the machine.

The efficiency of the control of this machine also can be increased by minimizing the effects of residual magnetism and hysteresis on the machine by providing a demagnetizing exciting arrangement which has substantially no effect on the main poles of the machine. This may be produced by providing components of magnetic excitation of opposite or reversed polarity to adjacent pole pieces and thereby minimizing the inductance effect of this excitation with the other field exciting windings of the machine. In this embodiment, the demagnetizing component of excitation is provided by connecting the field exciting winding sections 53, 54, 55, and 56 to an alternating current source of electrical power supply in a manner similar to that of the arrangement shown in Fig. 1. This second component source of energization is provided by a peaked wave form transformer 66 having its primary winding 67 connected to any suitable source of alternating current and its secondary winding 68 connected to terminals 69 and 70 of the field exciting windings 53, 54, 55, and 56, and these windings are arranged on the pole pieces such that adjacent pole pieces are excited with an alternating and pulsating component of magnetic excitation of opposite polarity, the instantaneous direction of which is indicated by the arrows 71. Thus, the demagnetizing component of excitation is provided to the machine without additional field exciting windings which is substantially independent of other components of excitation or with substantially no resultant mutual inductance effect between the excitation of this winding and other field exciting windings of the machine.

In Fig. 3, I have shown an armature reaction excited dynamo-electric machine provided with a stationary member 72 of magnetic material having pole pieces 73, 74, 75, and 76 adapted to provide a path of low magnetic reluctance for the armature reaction flux of the machine. This machine is provided with an armature or rotatable member 77 of the conventional direct current type which is adapted to be driven at a substantially constant speed by any suitable source of mechanical power. As in the other illustrated machines, the armature reactions of the machine are utilized to provide the desired characteristics thereto. These armature reactions are obtained by arranging a set of primary brushes 78 and 79 to provide a primary circuit through the armature 77, and these brushes are short circuited by an external conductor 80. A set of secondary brushes 81 and 82 is arranged to contact the commutator of the armature 77 and is electrically displaced thereabout from the primary brushes 78 and 79 to provide a secondary circuit through the armature. With this brush arrangement, a very small amount of flux is required to induce a voltage between the primary brushes to build up a relatively large primary current through that part of the armature winding which is connected between these brushes. This primary current will produce a component of magnetic excitation or primary armature reaction along the primary commutating axis of the machine, as indicated by the arrow 83. As the armature rotates, the conductors which are connected between the secondary brushes 81 and 82 will cut the primary armature reaction flux and a voltage will be induced between these brushes. When a load circuit is connected to these secondary brushes, a secondary or load current will flow through the secondary circuit of the armature and a secondary armature reaction will be produced along the commutating axis of these brushes, as indicated by the arrow 84.

In order to control the secondary or load characteristics of this machine, a field exciting winding 85 is arranged to provide a component of magnetic excitation along the secondary commutating axis of the machine, as indicated by arrows 86. As shown, the resultant excitation provided by this winding on the four pole pieces acts in a direction opposite to the secondary armature reaction 84, and is adapted to induce an electromotive force in the armature winding between the primary brushes 78 and 79. Any suitable means may be provided to vary the energization of this winding to control the excitation thereof and thereby control the voltage induced between the primary brushes. The sensitivity and speed of response of the machine to variations in the energization of the control field exciting winding 85 are increased by providing a compensating field exciting winding 87 arranged to provide a component of excitation which is substantially equal and opposite to the secondary armature reaction 84. This winding 87 is adapted to provide a direct current or unidirectional component of excitation in a direction as indicated by arrows 88 and proportional to the secondary armature current by connecting the winding 87 in series with the secondary brush 81. An analysis of the excitation provided by the field exciting windings 85 and 87 shows that while these windings are arranged on four pole pieces, each is adapted to provide two resultant poles, so that there are one-half as many primary poles and one-half as many secondary poles as the number of salient pole pieces on the stationary member of the machine; that is, such that the field exciting windings 85 and 87 are arranged on the pole pieces to provide a resultant pole for each pair of adjacent pole pieces, and the excitation of the field exciting windings 87 in neutralizing secondary armature reaction substantially neutralizes mutual coupling of electric current in the armature secondary circuit with the control field exciting windings 85.

The accuracy of the control of this type of dynamo-electric machine also can be increased by minimizing the effect of residual magnetism and hysteresis in the machine by providing a demagnetizing exciting arrangement to provide components of magnetic excitation of opposite or reversed polarity to adjacent pole pieces, thereby minimizing the inductance effect of this excitation with the other field exciting windings of the machine and provides an alternating component of excitation substantially independent of other components of excitation of the machine. This component of excitation is obtained in the illustrated arrangement by connecting an alternating current source of electrical power supply to the field exciting winding 85 intermediate the direct current series connected winding coils; that is, between windings on adjacent pole pieces forming single poles for the compensating arrangement. This energization is provided by a peaked wave form transformer 89 having its primary winding 90 connected to any suitable source of alternating current and its secondary winding 91 connected to terminals 92 and 93 of the field exciting windings 87, such that adjacent pole pieces are excited with a component of magnetic excitation of opposite polarity, instantaneous value of which is indicated by the arrows 94. This second component source of energization periodically reverses the component of excitation provided by the field exciting windings 87 in each pole piece in accordance with the frequency of the alternating current impressed across the primary of the transformer 89 providing an alternating and pulsating component of excitation and thereby minimizes the effects of residual magnetism and hysteresis on the excitation of the machine. I have found that by providing this field exciting winding arrangement and excitation system, it is possible to obtain a greater accuracy in the control of the characteristics of this type dynamo-electric machine with a minimum amount of field exciting windings, thereby decreasing the inductance of the machine.

While I have illustrated and described particular embodiments of my invention, modifications thereof will occur to those skilled in the art.

I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A dynamo-electric machine having a stationary member and a rotatable member provided with a commutator, a set of primary brushes and a set of secondary brushes circumferentially displaced about said commutator from said primary brushes arranged to provide a primary and a secondary circuit respectively through said rotatable member, means for controlling the secondary characteristics of said machine, and means including a field exciting winding providing a direct current component of excitation on the axis of a component of armature reaction of electric current in said rotatable member, said means also including an alternating current source of energization for said field exciting winding arranged and adapted to minimize the effects of residual magnetism and hysteresis on said machine by providing an alternating component of excitation substantially independent of said first-mentioned component of excitation of said field exciting winding.

2. A dynamo-electric machine having a stationary member and an armature provided with a commutator, a set of primary brushes and a set of secondary brushes circumferentially displaced about said commutator from said primary brushes adapted to provide a primary and a secondary circuit respectively through said armature, means including a field exciting winding for providing a direct current component of excitation along substantially the same axis as a component of armature reaction produced by electric current in said armature, and means being connected to said winding for providing a component of energization thereto including an alternating electric current and said winding being arranged on said stationary member for minimizing the effects of residual magnetism and hysteresis on said machine by providing an alternating current component of excitation substantially independent of said first-mentioned component of excitation of said field exciting winding without substantial interference with said first-mentioned component of excitation provided by said winding.

3. A dynamo-electric machine having a stationary member and an armature, means including field exciting windings for providing a component of excitation substantially in opposition to a component of armature reaction produced by electric current in said armature, and means for providing a second component of energization to said field exciting winding including a variable peaked wave form electric current for minimizing the effects of residual magnetism and hysteresis on said machine by providing an alternating current component of excitation substantially independent of said first-mentioned component of excitation of said field exciting winding without substantial interference with said first-mentioned component of excitation provided by said winding.

4. A dynamo-electric machine having a stationary member and a rotatable member provided with a commutator, a set of primary brushes and a set of secondary brushes circumferentially displaced about said commutator from said primary brushes arranged to provide a primary and a secondary circuit respectively through said rotatable member, means for controlling the secondary characteristics of said machine, and means for substantially neutralizing mutual coupling of electric current in said secondary circuit of said rotatable member with said controlling means, said neutralizing means also being arranged to minimize the effects of residual magnetism and hysteresis on said machine by providing an alternating component of excitation substantially independent of said first-mentioned component of excitation of said field exciting winding.

5. A dynamo-electric machine having a stationary member and an armature provided with a commutator, a set of primary brushes and a set of secondary brushes circumferentially displaced about said commutator from said primary brushes adapted to provide a primary and a secondary circuit respectively through said armature, means including a field exciting winding for providing a component of excitation substantially in the same direction as the component of armature reaction produced by electric current in said primary circuit, and means connected to said winding for substantially simultaneously providing a second component of energization thereto for minimizing the effects of residual magnetism and hysteresis on said machine without substantial interference with said first-mentioned component of excitation provided by said winding.

6. A dynamo-electric machine having a stationary member provided with pole pieces and a rotatable member provided with a commutator, a set of primary brushes and a set of secondary brushes circumferentially displaced about said commutator from said primary brushes and adapted to provide a primary and secondary circuit respectively through said rotatable member, means including field exciting windings for providing a component of excitation responsive to primary circuit electric current and being arranged on said pole pieces to provide a resultant pole for each pair of adjacent pole pieces in the same direction as armature reaction of primary circuit electric current, and means for providing a second component of energization to said field exciting windings for minimizing the effects of residual and hysteresis on said machine by providing an alternating current component of excitation substantially independent of said first-mentioned component of excitation of said field exciting winding without substantially interfering with said neutralizing action of said windings.

7. A dynamo-electric machine having a stationary member and an armature provided with a commutator, a set of primary brushes and a set of secondary brushes circumferentially displaced about said commutator from said primary brushes adapted to provide a primary and a secondary circuit respectively through said armature, means including a field exciting winding for providing a component of excitation substantially in opposition to a component of armature reaction produced by electric current in said armature secondary circuit, and means for providing a second component of energization to said field exciting winding by a variable electric current for minimizing the effects of residual magnetism and hysteresis on said machine by providing an alternating component of excitation substantially independent of said first-mentioned component of excitation of said field exciting winding without substantial interference with said first-mentioned component of excitation provided by said winding.

8. A dynamo-electric machine having a stationary member and a rotatable member provided with a commutator, a set of primary brushes and a set of secondary brushes circumferentially displaced about said commutator from said primary brushes arranged to provide a primary and a secondary circuit respectively through said rotatable member, means for controlling the secondary characteristics of said machine, means including field exciting windings for substantially neutralizing mutual coupling of electric current in said secondary circuit of said rotatable member with said controlling means, and auxiliary energizing means for said field exciting windings for minimizing the effects of residual magnetism and hysteresis on said machine by providing an alternating component of excitation substantially independent of said first-mentioned component of excitation of said field exciting winding without substantially interfering with said neutralizing action.

9. A dynamo-electric machine having a stationary member and a rotatable member provided with a commutator, a set of primary brushes and a set of secondary brushes circumferentially displaced about said commutator from said primary brushes adapted to provide a primary and a secondary circuit respectively through said rotatable member, means including field exciting windings for providing a component of excitation responsive to the load on said machine along substantially the same axis and in opposition to armature reaction excitation of electric current in said secondary circuit, and a second means for providing a component of energization to said field exciting windings by a variable electric current for minimizing the effects of residual magnetism and hysteresis on said machine by providing an alternating component of excitation substantially independent of said first-mentioned component of excitation of said field exciting winding without substantial interference with the resultant excitation of said load responsive component energization of said windings.

10. A dynamo-electric machine having a stationary member and a rotatable member provided with a commutator, a set of primary brushes and a set of secondary brushes circumferentially displaced about said commutator from said primary brushes adapted to provide a primary and a secondary circuit respectively through said rotatable member, means including field exciting windings for providing a component of excitation responsive to the load on said machine along substantially the same axis and in opposition to armature reaction excitation of electric current in said secondary circuit, and a second means for providing a component of energization to said field exciting windings including a variable peaked wave form electric current for minimizing the effects of residual magnetism and hysteresis on said machine by providing an alternating component of excitation substantially independent of said first-mentioned component of excitation of said field exciting winding without substantial interference with said load responsive component energization of said windings on said rotatable member.

11. A dynamo-electric machine having a stationary member and a rotatable member provided with a commutator, a set of primary brushes and a set of secondary brushes circumferentially displaced about said commutator from said primary brushes adapated to provide a primary and a secondary circuit respectively through said rotatable member, means including field exciting windings for providing a component of excitation responsive to the load on said machine along substantially the same axis and in opposition to armature reaction excitation of electric current in said secondary circuit, and a second means for providing a component of energization to said field exciting windings including an alternating electric current for minimizing the effects of residual magnetism and hysteresis on said machine by providing an alternating component of excitation substantially independent of said first-mentioned component of excitation of said field exciting winding without substantial interference with said load responsive component of energization of said winding on said rotatable member.

12. A dynamo-electric machine having a stationary member provided with pole pieces and a rotatable member provided with a commutator, a set of primary brushes and a set of secondary brushes circumferentially displaced about said commutator from said primary brushes and adapted to provide a primary and secondary circuit respectively through said rotatable member, means including field exciting windings for providing a component of excitation responsive to secondary circuit electric current and being arranged on said pole pieces to provide a resultant pole for each pair of adjacent pole pieces in opposition to armature reaction of secondary circuit electric current substantially to neutralize armature reaction of said secondary circuit current, and means for providing a component of energization to said field exciting windings for minimizing the effects of residual and hysteresis on said machine by providing an alternating component of excitation substantially independent of said first-mentioned component of excitation of said field exciting winding without substantially interfering with said neutralizing action of said windings.

13. A dynamo-electric machine having a stationary member provided with pole pieces and a rotatable member provided with a commutator, a set of primary brushes and a set of secondary brushes electrically displaced about said commutator from said primary brushes and adapted to provide a primary and a secondary circuit respectively through said rotatable member, means including field exciting windings for providing a component of magnetic excitation responsive to secondary circuit electric current and being arranged on said pole pieces to provide a resultant pole for each pair of adjacent pole pieces in opposition to armature reaction of secondary circuit electric current, and a second means for providing a component of energization to said field exciting windings for minimizing the effects of residual magnetism and hysteresis on said machine without substantially interfering with the resultant excitation of said load responsive component of energization of said windings, said second energization means being connected to said field exciting windings for providing components of magnetic excitation of opposite polarity to adjacent pole pieces of said stationary member.

14. A dynamo-electric machine having a stationary member provided with pole pieces and a rotatable member provided with a commutator, a set of primary brushes and a set of secondary brushes circumferentially displaced about said commutator from said primary brushes and adapted to provide a primary and a secondary circuit respectively through said rotatable member, means including field exciting windings for providing a component of excitation responsive to secondary circuit electric current and being arranged on said pole pieces to provide a resultant pole for each pair of adjacent pole pieces in opposition to armature reaction of secondary circuit electric current, and a second means arranged to provide a component of energization to said field exciting windings by a variable peaked wave form electric current for minimizing the effects of residual magnetism and hysteresis on said machine by providing an alternating component of excitation substantially independent of said first-mentioned component of excitation of said field exciting winding without substantially interfering with the resultant excitation of said load responsive component of energization of said windings.

15. A dynamo-electric machine having a stationary member provided with pole pieces and a rotatable member provided with a commutator, a set of primary brushes and a set of secondary brushes circumferentially displaced about said commutator from said primary brushes and adapted to provide a primary and a secondary circuit respectively through said rotatable member, means including field exciting windings for providing a component of magnetic excitation responsive to secondary circuit electric current and being arranged on said pole pieces to provide a resultant pole for each pair of adjacent pole pieces in opposition to armature reaction of secondary circuit electric current substantially to neutralize armature reaction of said secondary circuit current, and a second means arranged to provide a component of energization to said field exciting windings for minimizing the effects of residual magnetism and hysteresis on said machine by providing an alternating component of excitation substantially independent of said first-mentioned component of excitation of said field exciting winding without substantially interfering with said load responsive component of energization of said windings on said rotatable member.

16. A dynamo-electric machine having a stationary member provided with pole pieces and a rotatable member provided with a commutator, a set of primary brushes and a set of secondary brushes circumferentially displaced about said commutator from said primary brushes and adapted to provide a primary and a secondary circuit respectively through said rotatable member, means including field exciting windings for providing a component of excitation responsive to secondary circuit electric current and being arranged on said pole pieces to provide a resultant pole for each pair of adjacent pole pieces in opposition to armature reaction of said secondary circuit electric current, and a second means arranged to provide a component of energization to said field exciting windings by a variable peaked wave form electric current for minimizing the effects of residual magnetism and hysteresis on said machine without substantially interfering with the resultant excitation of said load responsive component of energization of said windings, said second energization means being connected to said field exciting windings for providing components of magnetic excitation of opposite polarity to adjacent pole pieces of said stationary member.

17. A dynamo-electric machine having a stationary member and an armature provided with a commutator, a set of primary brushes and a set of secondary brushes circumferentially displaced about said commutator from said primary brushes adapted to provide a primary and a secondary circuit respectively through said armature, means including a field exciting winding for providing a direct current component of excitation along substantially the same axis as the component of armature reaction produced by electric current in said armature primary circuit, and means being connected to said winding and said winding being arranged on said stationary member for providing an alternating current component of energization thereto for minimizing the effects of residual magnetism and hysteresis on said machine by providing an alternating component of excitation substantially independent of said first-mentioned component of excitation of said field exciting winding without substantial interference with said first-mentioned component of excitation provided by said winding.

18. A dynamo-electric machine having a stationary member and a rotatable member provided with a commutator, a set of primary brushes and a set of secondary brushes circumferentially displaced about said commutator from said primary brushes adapted to provide a primary and a secondary circuit respectively through said rotatable member, means including field exciting windings for providing a direct current component of excitation responsive to electric current in said primary circuit of said machine along substantially the same axis as armature reaction excitation of electric current in said primary circuit, and a second means for providing an alternating current component of energization to said field exciting windings for minimizing the effects of residual magnetism and hysteresis on said machine by providing an alternating component of excitation substantially independent of said first-mentioned component of excitation of said field exciting winding without substantial interference with said primary circuit current responsive component of energization of said windings on said rotatable member.

19. A dynamo-electric machine having a stationary member provided with pole pieces and a rotatable member provided with a commutator, a set of primary brushes and a set of secondary brushes electrically displaced about said commutator from said primary brushes and adapted to provide a primary and a secondary circuit respectively through said rotatable member, means including a second field exciting winding for providing a component of magnetic excitation responsive to primary circuit electric current and being arranged on said pole pieces to provide a resultant pole for each pair of adjacent pole pieces in the same direction as armature reaction of primary circuit electric current, and a second means for providing a component of energization to said second field exciting winding for minimizing the effects of residual magnetism and hysteresis on said machine without substantially interfering with the resultant excitation of said primary circuit current responsive component of energization of said second winding, said second energization means being connected to said second field exciting winding for providing components of magnetic excitation of opposite polarity to adjacent pole pieces of said stationary member.

20. A dynamo-electric machine having a stationary member and an armature provided with a commutator, a set of primary brushes and a set of secondary brushes circumferentially displaced about said commutator from said primary brushes adapted to provide a primary and a secondary circuit respectively through said armature, means including field exciting windings for providing a component of excitation responsive to electric current in said primary circuit of said machine along substantially the same axis as armature reaction excitation of electric current in said primary circuit, means including a second field exciting winding for providing a component of excitation substantially in the same direction as the component of armature reaction produced by electric current in said armature primary circuit, said winding being arranged on said stationary member and means being connected to said winding for providing a component of energization thereto including an alternating electric current for minimizing the effects of residual magnetism and hysteresis on said machine by providing an alternating component of excitation substantially independent of said first-mentioned component of excitation of said field exciting winding without substantial interference with said first-mentioned component of excitation provided by said winding.

21. A dynamo-electric machine having a stationary member provided with pole pieces and a rotatable member provided with a commutator, a set of primary brushes and a set of secondary brushes electrically displaced about said commutator from said primary brushes and adapted to provide a primary and a secondary circuit respectively through said rotatable member, means including field exciting windings for providing a component of magnetic excitation responsive to secondary circuit electric current and being arranged on said pole pieces to provide a resultant pole for each pair of adjacent pole pieces in opposition to armature reaction of secondary circuit electric current, means including a second field exciting winding for providing a component of magnetic excitation responsive to primary circuit electric current and being arranged on said pole pieces to provide a resultant pole for each pair of adjacent pole pieces in the same direction as armature reaction of primary circuit electric current, and a second means for providing a component of energization to said second field exciting winding for minimizing the effects of residual magnetism and hysteresis on said machine without substantially interfering with the resultant excitation of said primary circuit current responsive component of energization of said second winding, said second energization means being connected to said second field exciting winding for providing components of magnetic excitation of opposite polarity to adjacent pole pieces of said stationary member.

ALEC FISHER.